US012515464B2

(12) United States Patent
Ohashi et al.

(10) Patent No.: US 12,515,464 B2
(45) Date of Patent: Jan. 6, 2026

(54) RECORDING SYSTEM

(71) Applicant: SEIKO EPSON CORPORATION, Tokyo (JP)

(72) Inventors: Kazuyoshi Ohashi, Matsumoto (JP); Yu Tsumuraya, Ota-Ku (JP)

(73) Assignee: Seiko Epson Corporation, Tokyo (JP)

( * ) Notice: Subject to any disclaimer, the term of this patent is extended or adjusted under 35 U.S.C. 154(b) by 236 days.

(21) Appl. No.: 17/652,751

(22) Filed: Feb. 28, 2022

(65) Prior Publication Data

US 2022/0274427 A1 Sep. 1, 2022

(30) Foreign Application Priority Data

Mar. 1, 2021 (JP) ................................ 2021-031441

(51) Int. Cl.
*B65H 31/10* (2006.01)
*B41J 13/10* (2006.01)

(52) U.S. Cl.
CPC ............ *B41J 13/106* (2013.01); *B65H 31/10* (2013.01); *B65H 2801/03* (2013.01)

(58) Field of Classification Search
CPC .... B41J 13/106; B65H 31/10; B65H 2801/03; B65H 31/04; B65H 31/08
See application file for complete search history.

(56) References Cited

U.S. PATENT DOCUMENTS 6,378,860 B1 * 4/2002 Gutierrez ............... B65H 31/10 271/265.04
6,390,466 B1 * 5/2002 Sanmiya ................ B65H 31/14 271/213
9,033,339 B2 5/2015 Kato
2006/0087070 A1 * 4/2006 Cook ....................... B65H 1/00 271/145
2007/0158425 A1 * 7/2007 Matsuura ................. G06K 1/14 235/432
2008/0315504 A1 * 12/2008 Terao ..................... B65H 31/18 271/167
2014/0239577 A1 * 8/2014 Kato .................. G03G 15/6552 271/213
2019/0248168 A1 8/2019 Mamoru et al.
2019/0248615 A1 * 8/2019 Kubo ..................... B65H 31/02
2020/0299090 A1 * 9/2020 Uchida .................... B65H 1/14

FOREIGN PATENT DOCUMENTS

JP 2014-166894 9/2014
JP 2019-136946 A 8/2019
JP 2019-137518 A 8/2019
JP 2019-137519 A 8/2019

* cited by examiner

*Primary Examiner* — Thomas A Morrison
(74) *Attorney, Agent, or Firm* — WORKMAN NYDEGGER

(57) ABSTRACT

A recording system 1 includes a first discharge portion that discharges medium recorded on by ejecting ink, a stacking tray configured to have stacked thereon the medium P discharged by the first discharge portion, a raising and lowering mechanism 78 configured to raise and lower the stacking tray, a control unit 25 that controls the raising and lowering mechanism 78, and an estimation unit 51 configured to estimate weight of the medium P loaded on the stacking tray, wherein the control unit 25 controls the raising and lowering operation of the stacking tray based on the weight of the medium estimated by the estimation unit 51.

14 Claims, 9 Drawing Sheets

RECORDING SYSTEM

The present application is based on, and claims priority from JP Application Serial Number 2021-031441, filed Mar. 1, 2021, the disclosure of which is hereby incorporated by reference herein in its entirety.

BACKGROUND

1. Technical Field

The present disclosure relates to a recording system.

2. Related Art

The related art discloses a configuration in which weight of a sheaf of sheets formed on a processing tray is estimated, and when the weight of the sheaf of sheets is estimated to be heavy, a sheet transport unit is controlled so as to increase a conveying force per unit time when conveying the sheaf of sheets as compared with a case where the weight of the sheaf of sheets is estimated to be light. With this configuration, even when the weight of the sheaf of sheets is heavy, the sheaf of sheets can be reliably discharged to the stack tray.

However, in JP A-2019-137518, only the dischargeability of the sheaf of sheets formed on the processing tray is taken into consideration, and there is no description of the handling of the sheaf of sheets after discharge.

SUMMARY

Regarding sheets on which images are formed by an inkjet type printer, the weight of the sheaf of sheets after the sheaf of sheets is discharged onto the stack tray is a problem, and, depending on the weight of the sheaf of sheets, a movable stack tray cannot be normally controlled and the sheet alignment property deteriorates.

A recording system includes a discharge portion that discharges medium recorded on by ejecting liquid; a stacking portion configured to have stacked thereon the medium discharged by the discharge portion; a raising and lowering unit configured to raise and lower the stacking portion; a control unit configured to control the raising and lowering unit; and an estimation unit configured to estimate weight of the medium stacked on the stacking portion, wherein the control unit controls a raising and lowering operation of the stacking portion based on the weight of the medium estimated by the estimation unit.

DESCRIPTION OF EMBODIMENTS

1. First Embodiment

Figure 1:
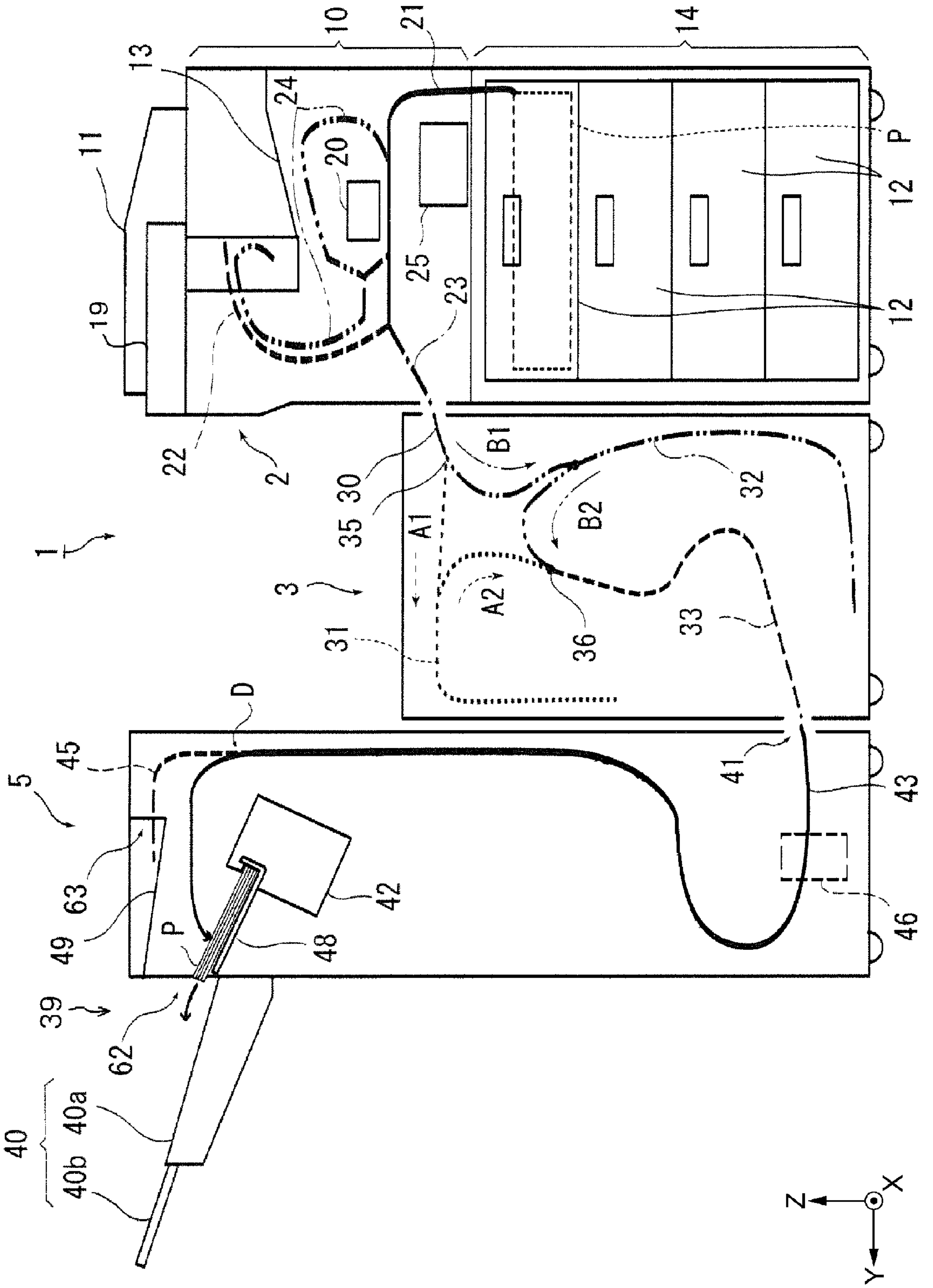
FIG. 1 shows a cross-sectional view of a recording system according to a first embodiment.

First, a first embodiment will be described. The recording system 1 illustrated in FIG. 1 includes, for example, a recording unit 2, an intermediate unit 3, and a post-processing device 5 in this order from right to left in FIG. 1.

The recording unit 2 performs recording on a transported medium P. The intermediate unit 3 receives the medium P from the recording unit 2 after recording and delivers the medium P to the post-processing device 5, and mainly performs a function of inverting the medium P and a function of promoting drying of the medium P. The post-processing device 5 is provided with an end binding unit 42 that performs end binding processing to bind the end of a sheaf of the medium P after recording in the recording unit 2.

Hereinafter, the recording unit 2, the intermediate unit 3, and the post-processing device 5 will be described in detail in this order.

Note that in the XYZ-coordinate system in each drawing, an X-direction is an apparatus depth direction, a Y-direction is an apparatus width direction, and a Z-direction is an apparatus height direction. The X-direction, the Y-direction, and the Z-direction are orthogonal to each other.

When forward and rearward of the apparatus depth direction are distinguished from each other, forward is referred to as a +X direction and rearward is referred to as a −X direction. When left and right of the apparatus width direction are distinguished from each other, left is referred to as a +Y direction and right is referred to as a −Y-direction. When up and down of the apparatus height direction are distinguished from each other, up is referred to as a +Z-direction and down is referred to as a −Z-direction.

The recording unit 2 is configured as a multifunctional machine including a printer unit 10 and a scanner unit 11. The printer unit 10 has a line head 20 as a recording section that performs recording on medium P. In the present embodiment, the line head 20 is configured as a so-called inkjet type recording head that performs recording by ejecting ink, which is an example of a liquid, onto the medium P.

A cassette storage portion 14 including a plurality of medium storage cassettes 12 is provided below the printer unit 10. The medium P accommodated in the medium storage cassettes 12 is fed through a feeding path 21 indicated by a solid line to a recording area of the line head 20, and a recording operation is performed. The medium P after being recorded on by the line head 20 is sent to either a first discharge path 22, which is a path for discharging the medium P to a post-recording discharge tray 13 provided above the line head 20, or a second discharge path 23, which is a path for sending the medium P to the intermediate unit 3.

In FIG. 1, the first discharge path 22 is indicated by a broken line, and the second discharge path 23 is indicated by a single-dot chain line. The second discharge path 23 extends in the +Y direction of the recording unit 2 and transfers the medium P to a reception path 30 of the adjacent intermediate unit 3.

In addition, the recording unit 2 includes a medium inverting path 24 indicated by a two-dot chain line in FIG. 1, and is configured to be capable of double-sided recording in which after recording on the first surface of the medium P, the medium P is inverted and recording is performed on the second surface. One or more roller pairs (not illustrated), as an example of a unit that transports the medium P, are disposed in each of the feeding path 21, the first discharge path 22, the second discharge path 23, and the medium inverting path 24.

In the recording unit 2, a control unit 25 is provided that controls operations related to transport and recording of the medium P in the recording unit 2. Note that the recording unit 2, the intermediate unit 3, and the post-processing device 5 of the recording system 1 are mechanically and electrically coupled to each other, and the recording system 1 is configured to transport the medium P from the recording unit 2 to the post-processing device 5. Note that the control unit 25 in this embodiment can control various operations in the post-processing device 5 and the intermediate unit 3 coupled to the recording unit 2.

The recording unit 2 includes an operation unit 19, and is configured so that various settings and execution commands related to various processes in the recording unit 2, the intermediate unit 3, and the post-processing device 5 can be input from the operation unit 19. In addition, the operation unit 19 includes a display panel (not illustrated), and is configured to display various information on the display panel.

When an external computer (not illustrated) is coupled to the recording system 1, the external computer can perform various settings and execution commands similar to the various settings and execution commands performed by the operation unit 19.

Figure 2:
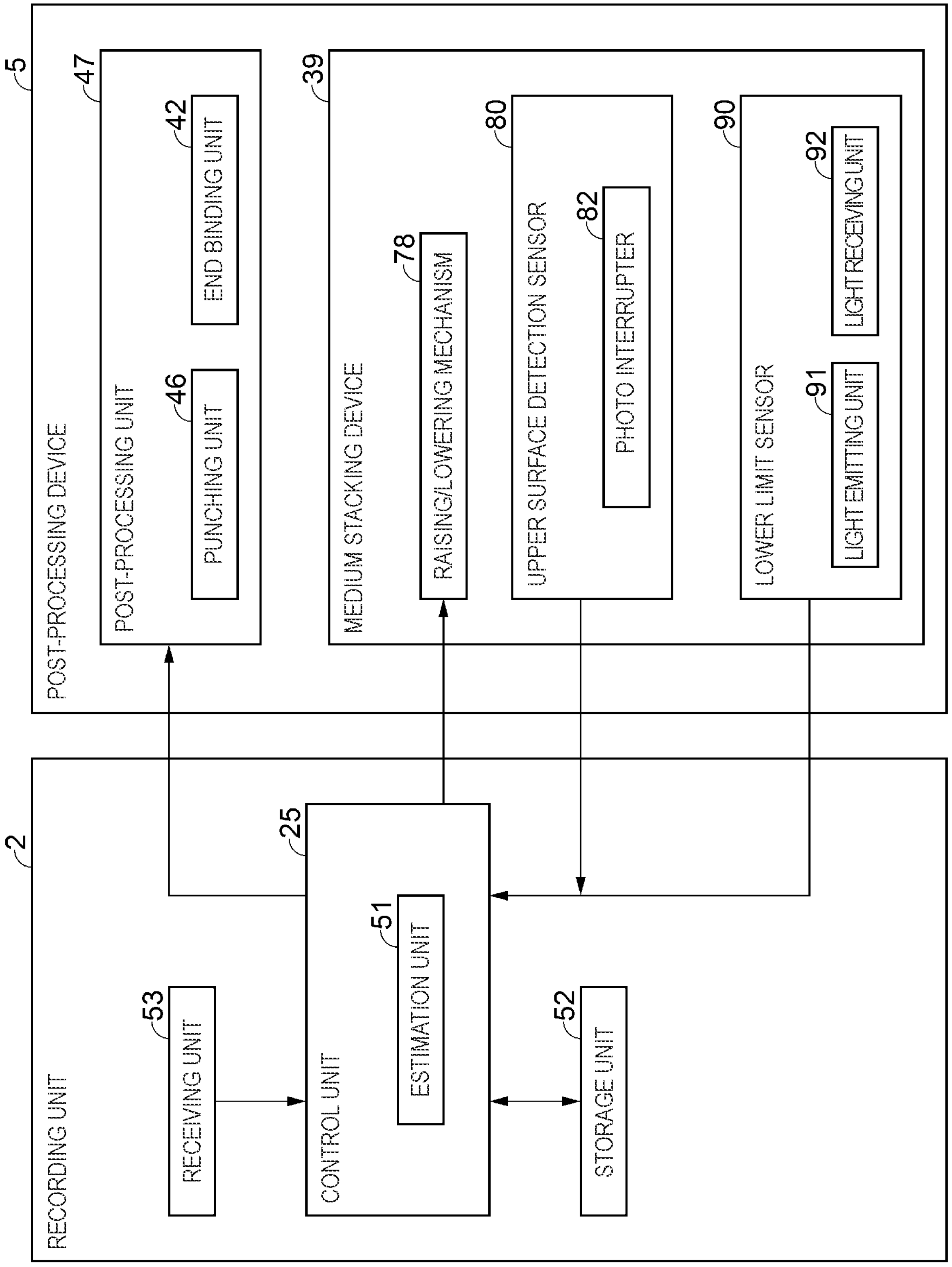
FIG. 2 is a block diagram of a recording unit and a post-processing device according to the first embodiment.

Next, the control configuration will be described with reference to the block diagram of FIG. 2.

The recording unit 2 includes the control unit 25, a storage unit 52, and a receiving unit 53. The receiving unit 53 receives from outside a recording command instructing execution of recording and recording data representing recording contents.

The control unit 25 is configured by a processor or the like, operates according to a control program stored in the storage unit 52, and controls the line head 20 based on the recording data received by the receiving unit 53 to perform recording. The control unit 25 includes an estimation unit 51 as a functional block realized by the control program. The estimation unit 51 estimates the weight of the medium P based on the recording data received by the receiving unit 53. The storage unit 52 is configured by a semiconductor memory or the like, stores the above-described control program, and stores the weight of an unrecorded medium P or the like.

As will be described later in detail, the post-processing device 5 includes a post-processing unit 47 and a medium stacking device 39. The medium stacking device 39 includes a raising and lowering mechanism 78, an upper surface detection sensor 80, and a lower limit sensor 90. The upper surface detection sensor 80 includes a photo interrupter 82 in which a light emitting element and a light receiving element are integrally configured, and the lower limit sensor 90 includes a light emitting unit 91 and a light receiving unit 92. The post-processing unit 47 includes a punching unit 46 and the end binding unit 42. The control unit 25 of the recording unit 2 is configured to control the post-processing unit 47 and the raising and lowering mechanism 78.

Next, the intermediate unit 3 will be described. The intermediate unit 3 illustrated in FIG. 1 transfers the medium P received from the recording unit 2 to the post-processing device 5. The intermediate unit 3 is disposed between the recording unit 2 and the post-processing device 5. The medium P transported through the second discharge path 23 of the recording unit 2 is received by the intermediate unit 3 through the reception path 30 and transported toward the post-processing device 5. Note that the reception path 30 is indicated by a two-dot chain line in FIG. 1.

In the intermediate unit 3, there are two transport paths for transporting the medium P. The first transport path is a path along which medium P is transported from the reception path 30, through a first switchback path 31 indicated by dotted line in FIG. 1, to a merge path 33. The second transport path is a path along which the medium P is transported from the reception path 30, through a second switchback path 32 indicated by a two-dot chain line in FIG. 1, to the merge path 33.

The first switchback path 31 is a path for receiving the medium P in the arrow direction A1 and then switching back the medium P in the arrow direction A2. The second switchback path 32 is a path for receiving the medium P in the arrow direction B1 and then switching back the medium P in the arrow direction B2.

The reception path 30 branches into the first switchback path 31 and the second switchback path 32 at a branch portion 35. The branch portion 35 is provided with a flap (not illustrated) for switching the destination of the medium P to either the first switchback path 31 or the second switchback path 32.

Further, the first switchback path 31 and the second switchback path 32 meet at a merge portion 36. Therefore, even if the medium P is sent from the reception path 30 to either the first switchback path 31 or the second switchback path 32, the medium P can be delivered to the post-processing device 5 via the common merge path 33.

The intermediate unit 3 receives the medium P from the recording unit 2 into the reception path 30 with the surface most recently recorded by the line head 20 facing upward. Thereafter, the medium P is bent and inverted and the most recently recorded surface is facing downward in the merge path 33.

Therefore, the medium P having the most recently recorded surface facing downward is delivered from the +Y direction of the intermediate unit 3 to a first transport path 43 of the post-processing device 5.

Note that one or more roller pairs (not illustrated), as an example of a unit that transports the medium P, are disposed in each of the reception path 30, the first switchback path 31, the second switchback path 32, and the merge path 33.

In the recording unit 2, when recording is continuously performed on plural sheets of the medium P, sheets of medium P that entered the intermediate unit 3 are alternately sent to a transport path passing through the first switchback path 31 and a transport path passing through the second switchback path 32. As a result, the throughput of medium transport in the intermediate unit 3 can be increased.

In addition, in a case of a configuration in which recording is performed by ejecting liquid, specifically ink, onto the medium P, such as in the line head 20 of the present embodiment, if the medium P is moist when processing is performed in the subsequent stage of the post-processing device 5, the recorded surface may be rubbed or the alignment of the medium P may be defective.

By delivering the medium P after recording from the recording unit 2 to the post-processing device 5 via the intermediate unit 3, it is possible to increase the transport time until the medium P after recording is sent to the post-processing device 5 and to further dry the medium P before reaching the post-processing device 5.

Next, the post-processing device 5 will be described. The post-processing device 5 illustrated in FIG. 1 includes a reception portion 41 that receives the medium P from the intermediate unit 3. The reception portion 41 is disposed at the lower portion of the post-processing device 5 in the −Y direction. The medium P transported through the merge path 33 of the intermediate unit 3 enters the post-processing device 5 through the reception portion 41.

The post-processing device 5 includes the end binding unit 42 that performs processing on the medium P received from the reception portion 41.

The post-processing device 5 includes the first transport path 43 that transports the medium P received from the reception portion 41 to the end binding unit 42.

The end binding unit 42 is a constituent unit that performs an end binding process of binding an end portion of the medium P, for example, a corner portion to one side of the medium P or an edge to one side of the medium P. The end binding unit 42 includes, for example, a stapler.

The post-processing device 5 further includes the punching unit 46 that performs punching on the medium P received from the reception portion 41. The punching unit 46 is provided at a position close to the reception portion 41 in the first transport path 43 through which the medium P received by the post-processing device 5 passes, and is configured to perform punching at an upstream part of the first transport path 43. The medium P received from the reception portion 41 may or may not be punched by the punching unit 46.

The medium P received from the reception portion 41 is sent to a processing tray 48 through the first transport path 43 illustrated in FIG. 1. In the processing tray 48, the medium P is stacked on the processing tray 48 with their rear edges in the transport direction aligned. When a predetermined number of sheets of the medium P are stacked on the processing tray 48, the end binding processing by the end binding unit 42 can be performed at the rearward ends of the medium P. The post-processing device 5 includes a first discharge portion 62 as a discharge portion that discharges the medium P in the +Y direction. Note that the post-processing device 5 includes a second discharge portion 63 (to be described later) in addition to the first discharge portion 62, and is configured to be able to discharge the medium P also from the second discharge portion 63.

The medium P processed by the end binding unit 42 is discharged by a discharge unit (not illustrated) from the first discharge portion 62 out of the housing of the post-processing device 5, and is stacked on a stacking tray 40 as a stacking portion constituting the medium stacking device 39.

The stacking tray 40 is provided so as to protrude in the +Y direction from the post-processing device 5. In the present embodiment, the stacking tray 40 includes a base part 40*a* and an extension part 40*b*. The extension part 40*b* is configured to retract into the base part 40*a*.

An upper tray 49 is provided in an upper portion of the post-processing device 5, and the medium P is discharged by a discharge unit (not illustrated) to the upper tray 49 from the second discharge portion 63 described above. A second transport path 45 is provided between a branch portion D on the first transport path 43 and the second discharge portion 63, and the medium P received from the reception portion 41 is discharged to the upper tray 49 via the second transport path 45 without passing through the end binding unit 42.

Next, the medium stacking device 39 included in the post-processing device 5 will be described.

Figure 3:
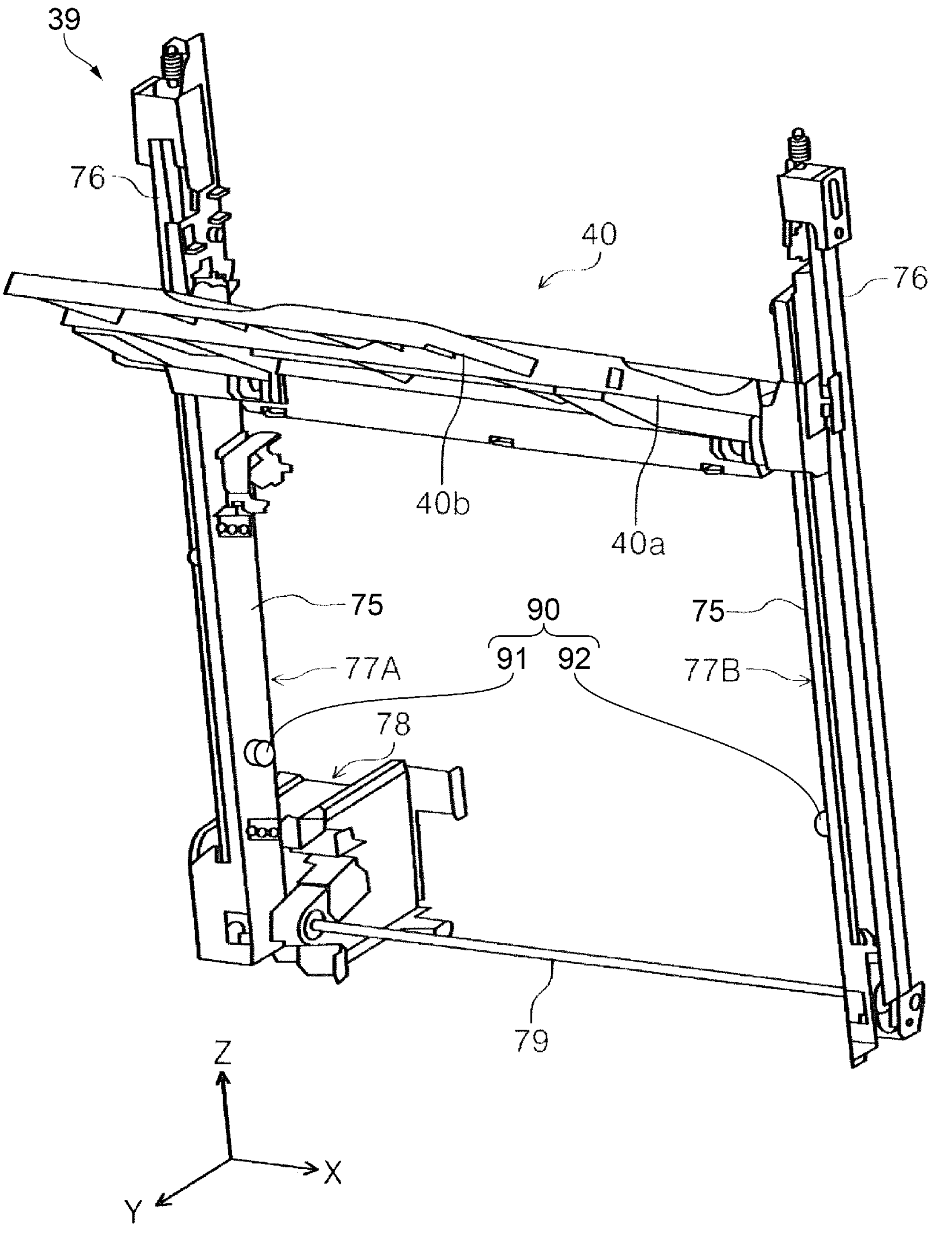
FIG. 3 is a perspective view of a medium stacking device according to the first embodiment.

FIG. 3 is a diagram illustrating an overall configuration of the medium stacking device 39 for raising and lowering the stacking tray 40, and includes a raising and lowering guide 77A positioned further in the −X direction than the stacking tray 40, and another raising and lowering guide 77B positioned further in the +X direction than the stacking tray 40. The raising and lowering guides 77A, 77B have a guide frame 75 extending in the Z-axis direction as a base body, and a plurality of components are assembled in the guide frame 75.

A drive belt 76 is provided along the Z-axis direction on the raising and lowering guides 77A, 77B, and the stacking tray 40 is pulled in the raising direction and the lowering direction by the drive belt 76. In this embodiment, the upward direction of the stacking tray 40 is the +Z direction, and the downward direction thereof is the −Z direction. The X-axis direction is the width direction of the stacking tray 40.

A raising and lowering mechanism 78 serving as a raising and lowering unit is provided below the raising and lowering guide 77A of the raising and lowering guides 77A, 77B. The raising and lowering mechanism 78 has a motor as a drive source, and drives the drive belt 76 by the motor to raise and lower the stacking tray 40. Note that a transmission shaft 79 is provided between the raising and lowering guide 77A and the raising and lowering guide 77B, and the power of the raising and lowering mechanism 78 is transmitted to the raising and lowering guide 77B side by the transmission shaft 79. In the present embodiment, a stepping motor is used as the motor of the raising and lowering mechanism 78, but another type of motor such as a DC motor may be used. In the present embodiment, the control unit 25 controls the raising and lowering mechanism 78 to raise and lower the stacking tray 40.

Although not illustrated in FIG. 3, the upper surface detection sensor 80 is provided above the stacking tray 40 of the medium stacking device 39.

Figure 4A:
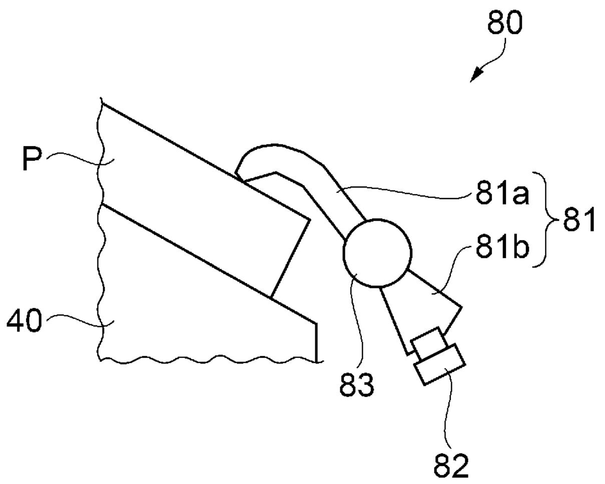
FIG. 4A is a side view of an upper surface detection sensor according to the first embodiment.
Figure 4B:
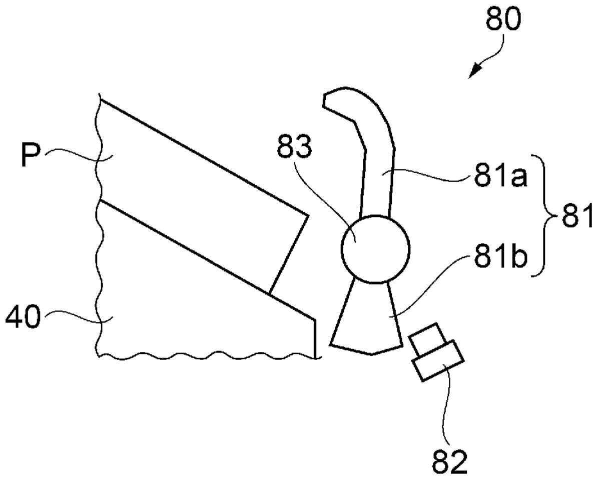
FIG. 4B is a side view of the upper surface detection sensor according to the first embodiment.

As illustrated in FIGS. 4A and 4B, the upper surface detection sensor 80 is configured to detect the position of the upper surface of the medium P stacked on the stacking tray 40. More specifically, the upper surface detection sensor 80 detects the upper surface of the medium P when the medium P is stacked on the stacking tray 40, and detects the upper surface of the stacking tray 40 itself when the medium P is not stacked on the stacking tray 40. Hereinafter, both the upper surface of the stacking tray 40 itself and the upper surface of the medium P stacked on the stacking tray 40 are referred to as the upper surface of the medium P on the stacking tray 40.

As described above, the control unit 25 raises and lowers the stacking tray 40 by controlling the raising and lowering mechanism 78. The control unit 25 keeps the distance between the first discharge portion 62 and the upper surface of the medium P on the stacking tray 40 constant by controlling the raising and lowering mechanism 78 using the detection result of the upper surface detection sensor 80.

The upper surface detection sensor 80 includes a flag 81 and the photo interrupter 82. The flag 81 is configured to be swung about a rotation shaft 83. In addition, the flag 81 is configured to include a tip end portion 81*a* which comes into contact with the upper surface of the medium P on the stacking tray 40 and a detected portion 81*b* which is detected by the photo interrupter 82.

The control unit 25 can grasp the state of the flag 81 based on the detection result of the photo interrupter 82.

The tip end portion 81*a* is configured to be pivotable around the rotation shaft 83 between an advanced position (refer to FIG. 4A) in which the tip end portion 81*a* is advanced onto the stacking tray 40 and a retracted position (refer to FIG. 4B) in which the tip end portion 81*a* is retracted from the stacking tray 40.

The tip end portion 81*a* moves to the advanced position after the medium P is discharged onto the stacking tray 40, and moves to the retracted position before subsequent medium P is discharged. In the advanced position, the tip end portion 81*a* abuts against the upper surface of the medium P on the stacking tray 40, and pivots in accordance with the raising and lowering operation of the stacking tray 40.

In accordance with the medium P being discharged from the first discharge portion 62, the control unit 25 raises and lowers the stacking tray 40 up and down, and determines a standby position based on the detection result of the upper surface detection sensor 80. Here, the standby position is the position of the stacking tray 40 that receives the medium P discharged from the first discharge portion 62, that is, the height of the stacking tray 40.

Hereinafter, a standby position determination operation for determining the standby position of the stacking tray 40 will be described.

First, when the medium P is stacked on the stacking tray 40, the control unit 25 causes the tip end portion 81*a* of the upper surface detection sensor 80 to advance to the advance position and to abut against the upper surface of the medium P. The control unit 25 acquires a detection result of the photo interrupter 82 when the upper surface detection sensor 80 comes into contact with the upper surface of the medium P.

When the detection signal of the photo interrupter 82 is ON, that is, when the photo interrupter 82 detects the detected portion 81*b*, the control unit 25 does not change the position of the stacking tray 40.

On the other hand, when the detection signal of the photo interrupter 82 is OFF, that is, when the photo interrupter 82 does not detect the detected portion 81*b*, the control unit 25 lowers the position of the stacking tray 40. This is because it is possible to judge that the distance between the upper surface of the medium P on the stacking tray 40 and the first discharge portion 62 has been narrowed by stacking of medium P.

In the process of lowering the stacking tray 40 downward, the detection signal of the photo interrupter 82 is switched from OFF to ON, and then switched from ON to OFF. The control unit 25 stops the lowering of the stacking tray 40 based on the switching from ON to OFF.

Then, the control unit 25 raises the stacking tray 40 until the detection signal of the photo interrupter 82 changes from OFF to ON, and stops raising the stacking tray 40 based on the change to ON. The above is the standby position determination operation.

As described above, the control unit 25 performs the standby position determination operation including the lowering operation of lowering the stacking tray 40 and the raising operation of raising the stacking tray 40 based on the detection result of the upper surface detection sensor 80, thereby maintaining the upper surface of the medium P on the stacking tray 40 at a predetermined position, that is, a predetermined height.

By this standby position determination operation, the distance between the upper surface of the medium P on the stacking tray 40 and the first discharge portion 62 is kept substantially constant, and reduces the concern of alignment property deterioration when the medium P is discharged.

Here, the sensor including the flag 81 and the photo interrupter 82 is used as the upper surface detection sensor 80 that detects the upper surface of the medium P on the stacking tray 40, but this disclosure is not limited thereto, and the upper surface detection may be performed using other sensors.

Returning to FIG. 3, the medium stacking device 39 is provided with the lower limit sensor 90. The lower limit sensor 90 is a transmissive-type sensor including the light emitting unit 91 provided on the raising and lowering guide 77A and the light receiving unit 92 provided on the raising and lowering guide 77B.

The lower limit sensor 90 is provided at the lower part of the raising and lowering guides 77A, 77B and is configured to detect, based on a light receiving state of the light receiving unit 92, that the stacking tray 40 has reached the lower limit position.

The configuration is such that the upper surface of the medium P on the stacking tray 40 is detected by the upper surface detection sensor 80, so that the upper surface of the medium P is disposed at a predetermined position.

In other words, as the number of sheets of medium P stacked on the stacking tray 40 increases, the position of the stacking tray 40 moves downward.

For this reason, as the medium P is discharged onto the stacking tray 40, the stacking tray 40 moves downward and finally blocks light from the light emitting unit 91. As a result, the light receiving unit 92 does not receive light from the light emitting unit 91, and the detection result of the lower limit sensor 90 changes. The control unit 25 judges that the stacking tray 40 has reached the lower limit position based on the change in the detection result. That is, it is judged that the medium P on the stacking tray 40 has reached the stacking upper limit.

In this manner, the stacking upper limit of the stacking tray 40 is monitored based on the detection result of the lower limit sensor 90. Here, the stacking upper limit of the stacking tray 40 is monitored by the lower limit sensor 90, but the stacking upper limit may be monitored by counting the number of sheets of medium P discharged onto the stacking tray 40.

As described above, the stacking upper limit of medium P stacked on the stacking tray 40 is monitored by a predetermined method, and the stacking tray 40 operates under this monitoring.

However, in a case where recording is performed by an inkjet printer such as the recording unit 2 of the present embodiment, there are cases in which the above-described method of monitoring the stacking upper limit is insufficient. In a case where recording is performed on the medium. P by the inkjet printer, the weight of ink is added to the weight of the unrecorded medium P, and the sum becomes the weight of the medium P. In other words, the weight of the medium P increases as the amount of ejected ink increases. For this reason, when medium P having a large amount of ink and heavy weight is excessively stacked on the stacking tray 40, a load is also applied to the raising and lowering mechanism 78 that raises and lowers the stacking tray 40, and there is a concern that the raising and lowering operation of the stacking tray 40 cannot be appropriately controlled. As a result, the distance between the upper surface of the medium P on the stacking tray 40 and the first discharge portion 62 changes, and there is a concern that alignment may deteriorate. Also, there is also a concern that the raising and lowering mechanism 78 of the stacking tray 40 may be damaged, or abnormal noise may be generated due to a load equal to or greater than expected being applied.

Therefore, in the present disclosure, the weight of the medium P is estimated taking into account the weight of ink ejected onto the medium P, and the stacking tray 40 is controlled. As a result, deterioration in the alignment of the medium P on the stacking tray 40 can be reduced, and damage to the raising and lowering mechanism 78 and generation of abnormal noise can be reduced.

Hereinafter, the weight of the medium P is the weight of the medium P taking into consideration the weight of the ink ejected onto the medium P. Further, the weight of the medium P without taking into account the weight of the ink ejected onto the medium P is referred to as the weight of the unrecorded medium P.

The estimation unit 51 is used to estimate the weight of the medium P stacked on the stacking tray 40. The estimation unit 51 estimates the amount of ink ejected onto the medium P by the line head 20 and estimates the weight of the ink from the amount of ink. Then, the weight of the medium P is estimated by adding the weight of the ink to the weight of the unrecorded medium P.

Specifically, the estimation unit 51 refers to the recording data received by the receiving unit 53 in order to estimate the weight of the ink ejected by the printer unit 10. Also, the number of dots of ink used for printing is acquired from the recording data.

The estimation unit 51 calculates the weight of ink ejected onto the medium P by multiplying the number of dots of ink used for recording by the weight of ink per dot, and estimates the calculated weight as the weight of the ink. At this time, the weight of ink per dot may be individually set based on dot size.

Further, in the case of double-sided printing, the weight of ink is calculated for each of the front surface and the back surface, and the sum of the weights is estimated as the weight of the ink.

Then, the estimation unit 51 adds the weight of ink to the weight of the unrecorded medium P, and thereby estimates the sum as the weight of the medium P.

Here, since the weight of the unrecorded medium P varies depending on the paper type and the paper size, it is preferable to change the weight of the unrecorded medium P depending on the paper type and the paper size of the medium P on which recording is performed. At this time, the weight of the unrecorded medium P may be estimated by using only one of paper type or paper size of the medium P.

The estimation unit 51 can estimate the total weight of the medium P on the stacking tray 40 by estimating the weight of the medium P per sheet and adding the weight each time medium P is stacked on the stacking tray 40. Hereinafter, the total weight of the medium P stacked on the stacking tray 40 is referred to as the weight of the medium P on the stacking tray 40.

The control unit 25 controls the raising and lowering operation of the stacking tray 40 based on the weight of the medium P on the stacking tray 40 estimated by the estimation unit 51.

Here, in a case where it is judged that the weight of the medium P stacked on the stacking tray 40 is equal to or greater than a threshold value or became equal to or greater than the threshold value, the control unit 25 restricts the raising and lowering operation of the stacking tray 40. In the present embodiment, limiting the raising and lowering operation means prohibiting the raising and lowering operation.

Accordingly, since the stacking tray 40 does not operate in a state in which a load equal to or greater than expected is applied, it reduces the concern of deterioration of the alignment of the medium P on the stacking tray 40 due to appropriately controlling the raising and lowering operation of the stacking tray 40.

In addition, it can reduce damage to the raising and lowering mechanism 78 or generation of abnormal noise before the stacking tray 40 reaches the stacking upper limit.

Figure 5A:
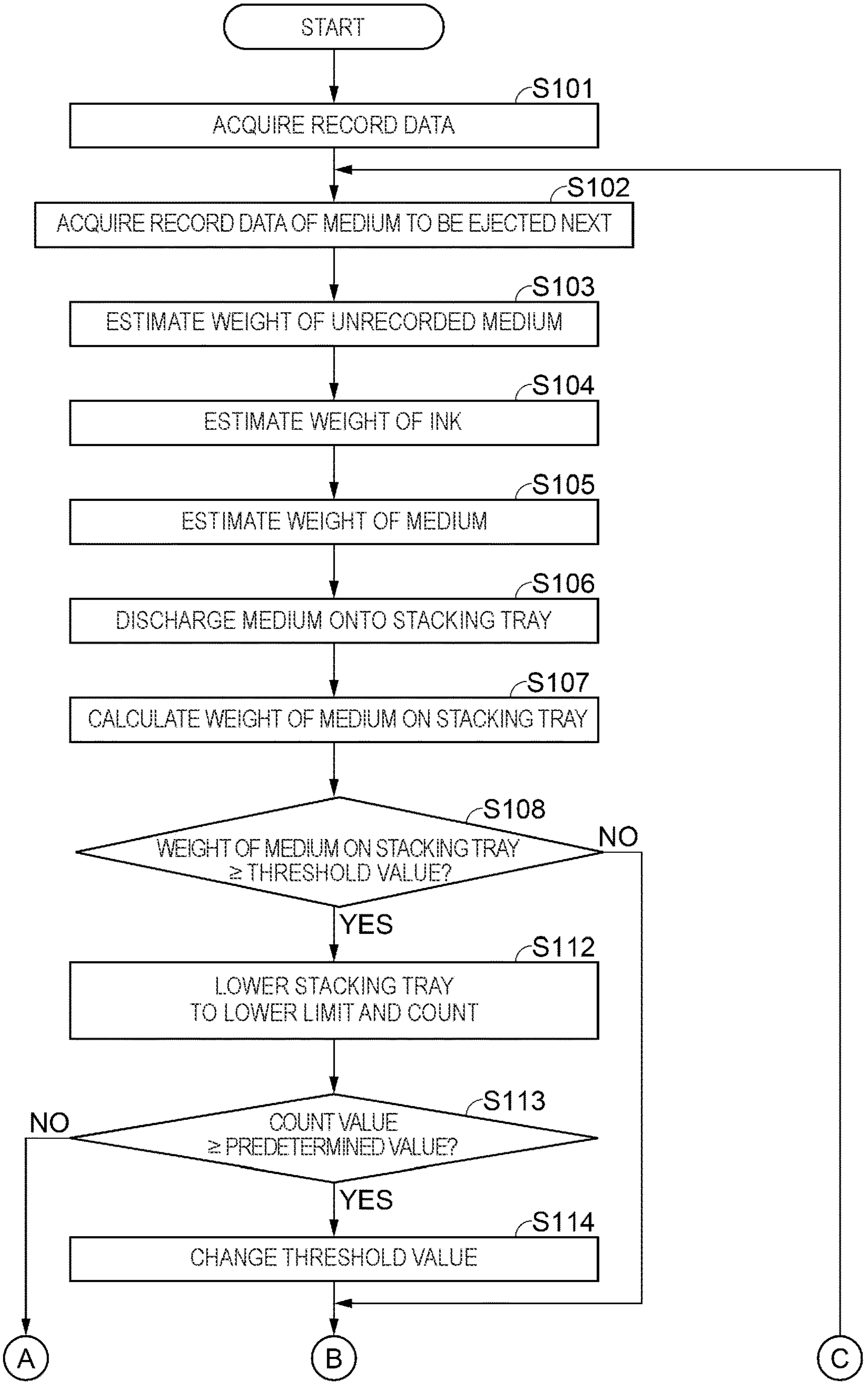
FIG. 5A is a flowchart of a raising and lowering operation of a raising and lowering mechanism according to the first embodiment.
Figure 5B:
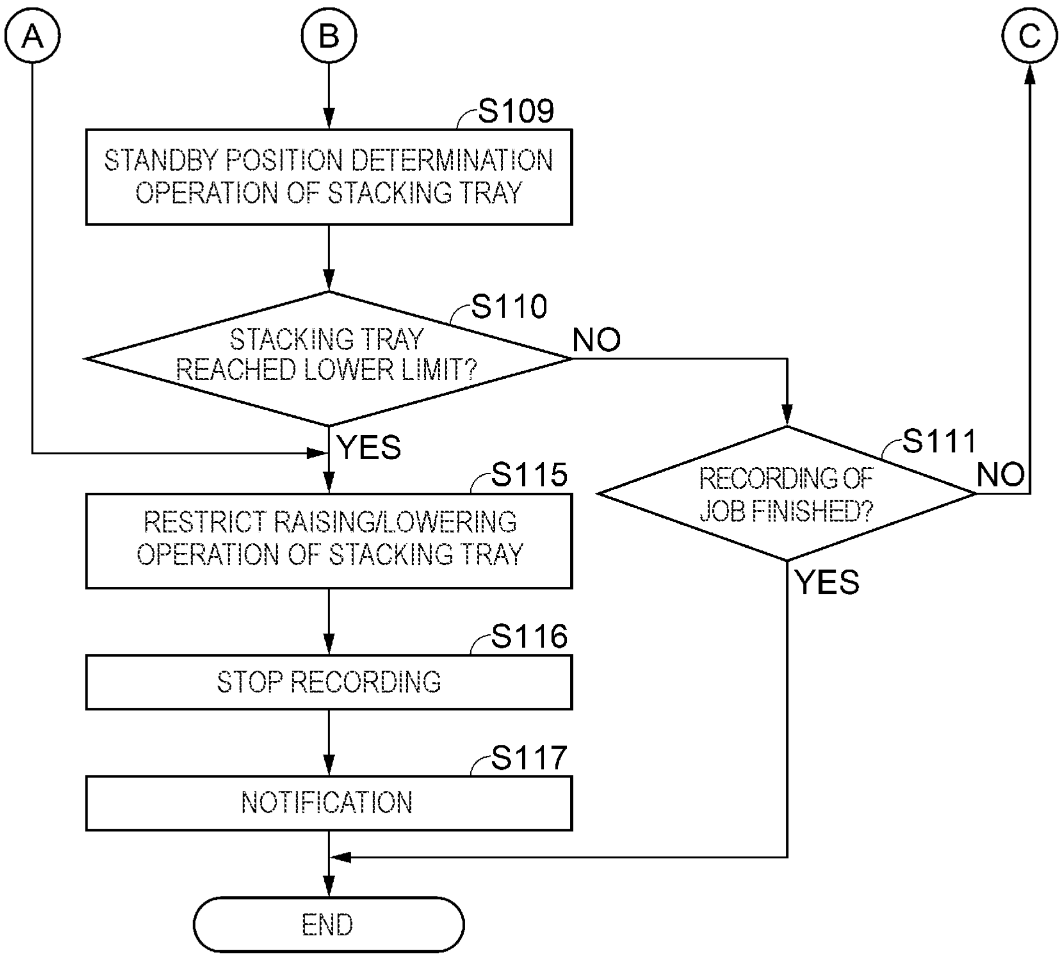
FIG. 5B is a flowchart of the raising and lowering operation of the raising and lowering mechanism according to the first embodiment.

Hereinafter, a specific operation will be described based on the flowcharts of FIGS. 5A, 5B.

When the user instructs to start recording and the receiving unit 53 receives the recording instruction and the record data of the job corresponding to the recording instruction, the estimation unit 51 acquires the record data received by the receiving unit 53 (step S101). Then, the record data of the medium P to be discharged next from the first discharge portion 62 is acquired from the acquired record data (step S102). The estimation unit 51 estimates at least one of the paper type or the paper size using the record data, and estimates the weight of the unrecorded medium P by referring to the storage unit 52 (step S103).

After estimating the weight of the unrecorded medium P, the estimation unit 51 estimates the weight of ink to be ejected based on the record data (step S104). Then, the weight of the medium P is estimated by adding the weight of the ink acquired in step S104 to the weight of the unrecorded medium P acquired in step S103 (step S105). Then, the control unit 25 discharges the medium P onto the stacking tray 40 (step S106). Then, the estimation unit 51 calculates the weight of the medium P on the stacking tray 40 by adding the weight of the medium P acquired in step S105 to the weight of the medium P already discharged on the stacking tray 40 (step S107).

Here, the control unit 25 judges whether or not the weight of the medium P on the stacking tray 40 calculated by the estimation unit 51 in step S107 is equal to or greater than a threshold value (step S108).

In the determination in step S108, when it is judged that the weight of the medium P on the stacking tray 40 is equal to or greater than the threshold value, the control unit 25 performs the lowering operation of the stacking tray 40 until the stacking tray 40 reaches the lower limit, that is, until the stacking tray 40 is detected by the lower limit sensor 90 (step S112). In this lowering operation, the control unit 25 counts the time until the stacking tray 40 reaches the lower limit, and sets this value as a count value.

This operation is for grasping the position of the stacking tray 40, and is an operation for confirming whether or not the medium P on the stacking tray 40 has been taken away by the user. In a case where the medium P on the stacking tray 40 is carried away by the user, the stacking tray 40 is raised by the standby position determination operation, and the number of sheets of medium P that can be stacked on the stacking tray 40 is increased. However, since the control unit 25 performs the determination based on the estimation result by the estimation unit 51, it may be erroneously judged that the weight of the medium P on the stacking tray 40 is equal to or greater than the threshold value. For this reason, the control unit 25 judges whether or not the medium P on the stacking tray 40 has been taken away by the user by performing an operation of grasping the position of the stacking tray 40. Specifically, when the count value is equal to or greater than a predetermined value, that is, when the stacking tray 40 is lowered more than expected, the control unit 25 judges that the user has taken away the medium P and changes the threshold value of the weight of the medium P. In this case, the threshold value of the weight of the medium P may be changed based on the count value. The changed threshold value when the count value is larger than the predetermined value may be made larger than the changed threshold value when the count value is smaller than the predetermined value. On the other hand, in a case where the count value is smaller than the predetermined value, it is judged that the medium P has not been taken away by the user and the threshold value is not changed.

In this manner, the control unit 25 judges whether or not the count value is equal to or greater than a predetermined value (step S113), and judges that the medium P was not taken away by the user when the count value is smaller than the predetermined value. Then, the control unit 25 restricts the raising and lowering operation of the stacking tray 40 (step S115), and stops recording (step S116). Then, the user is notified that the medium P cannot be discharged onto the stacking tray 40 (step S117).

On the other hand, when it is judged in the determination in step S108 that the weight of the medium P on the stacking tray 40 is not equal to or greater than the threshold value, the process proceeds to step S109.

Further, in step S113, when the count value is equal to or greater than the predetermined value, that is, when it is judged that medium P was taken away by the user, the control unit 25 changes the threshold value of the weight of the medium P (step S114). To be specific, by increasing the threshold value, additional medium P can be accepted, and the process proceeds to step S109.

In step S109, the control unit 25 performs a standby position determination operation of the stacking tray 40. As the standby position determination operation, as described above, the control unit 25 raises and lowers the stacking tray 40 based on the detection result of the upper surface detection sensor 80, and keeps constant the distance between the first discharge portion 62 and the upper surface of the medium P on the stacking tray 40.

After the standby position determination operation of the stacking tray 40 is performed, the control unit 25 judges whether or not the stacking tray 40 has reached the lower limit based on the detection result of the lower limit sensor 90 (step S110). Here, in a case where it is judged that the stacking tray 40 has reached the lower limit, the control unit 25 restricts the raising and lowering operation of the stacking tray 40 (step S115), and stops recording (step S116). Then, the control unit 25 notifies the user that the medium P cannot be discharged onto the stacking tray 40 (step S117).

On the other hand, if it is judged in step S110 that the stacking tray 40 has not reached the lower limit, the control unit 25 judges whether the job has ended (step S111). When the job is finished, the operation ends, and when the job is not finished, the processing returns to step S102, and the same processing is performed with respect to subsequent medium P.

In this manner, the control unit 25 judges whether or not the weight of the medium P on the stacking tray 40 is equal to or greater than the threshold value. When the weight of medium P on the stacking tray 40 is equal to or greater than the threshold value, the control unit 25 restricts the raising and lowering operation of the stacking tray 40.

Because the stacking tray 40 does not operate in a state in which a load equal to or greater than expected is applied, concern about deterioration of the alignment of the medium P on the stacking tray 40, due to being unable to appropriately control the raising and lowering operation of the stacking tray 40, can be reduced.

In addition, generation of abnormal noise or damage to the raising and lowering mechanism 78 before reaching the stacking upper limit of the stacking tray 40 can be reduced.

Note that the predetermined value to be compared with the count value of until the stacking tray 40 reaches the lower limit is preferably determined based on the number of sheets of medium P stacked on the stacking tray 40 and the amount of ink ejected onto the medium P.

In the case of medium P on which recording has been performed by an inkjet printer, curling occurs as the medium P absorbs ink. The degree of curling varies depending on the amount of ink ejected onto the medium P.

Therefore, the height of the medium P stacked on the stacking tray 40 changes depending on the number of sheets of medium P and the amount of ink ejected onto the medium P. In other words, in a case where the upper surface position of the medium P on the stacking tray 40 is constant, the distance from the stacking tray 40 to the lower limit sensor 90 changes depending on the number of sheets of medium P and the amount of ink ejected onto the medium P.

For this reason, by changing the predetermined value based on the number of sheets of medium P on the stacking tray 40 and the amount of ink ejected onto the medium P, it is possible to more accurately judge whether or not the user has taken away the medium P.

Further, instead of the amount of ink ejected onto the medium P, a printing coverage ratio of the medium P that can be calculated from recording data may be used.

In addition, in a case where a stepping motor is used as the motor of the raising and lowering mechanism 78, the number of steps until the stacking tray 40 blocks the light of the light emitting unit 91 may be used as a count value to judge whether the medium P has been taken away by the user.

Further, in addition to limiting the raising and lowering operation of the stacking tray 40 in both the raising operation and the lowering operation, the restriction of the raising and lowering operation includes restricting only the raising operation of the stacking tray 40.

When the raising operation for raising the stacking tray 40 and the lowering operation for lowering the stacking tray 40 are performed, the load on the raising and lowering mechanism 78 is increased more when the raising operation is performed. The load applied to the raising and lowering mechanism 78 is smaller in the lowering operation than in the raising operation.

Therefore, by permitting the lowering operation, discharge of the medium P can be continued and the raising and lowering mechanism 78 can be appropriately controlled, and deterioration of the alignment of the medium P can be reduced as well as damage to the raising and lowering mechanism 78 and generation of abnormal noise can be reduced.

2. Second Embodiment

Next, a second embodiment will be described. In the following description, the same components as those of the first embodiment are denoted by the same reference numerals, and a redundant description thereof will be omitted.

The second embodiment is the same as the first embodiment in that the raising and lowering operation of the stacking tray 40 is restricted when the weight of the medium P on the stacking tray 40 is equal to or greater than a threshold value. However, the operation until the raising and lowering operation is restricted is different from that of the first embodiment.

In the second embodiment, when the weight of the medium P on the stacking tray 40 is equal to or greater than a threshold value, the control unit 25 determines the remaining number of stackable sheets and discharges from the first discharge portion 62 based on the remaining number of stackable sheets.

The remaining number of stackable sheets is the number of sheets of medium P that can be discharged onto the stacking tray 40, and it is judged that the weight of the medium P on the stacking tray 40 has reached the upper limit when the remaining number of stackable sheets is discharged onto the stacking tray 40.

Note that the threshold value in the second embodiment may be different from the threshold value in the first embodiment.

In this configuration, the control unit 25 can grasp the number of remaining sheets of medium P that when stacked on the stacking tray 40 will bring the weight of the medium P stacked on the stacking tray 40 to the upper limit. Therefore, it is possible to prevent recording from being stopped in the middle of a job when recording of the job is performed over a plurality of sheets.

At this time, it is preferable to determine the remaining number of stackable sheets based on the assumed maximum weight per sheet of medium P. The assumed maximum weight per sheet is the weight of the medium P in a case where the maximum number of dots that can be ejected onto the medium P are ejected onto the medium P.

Here, a value obtained by dividing the remaining stackable weight at the stage of being equal to or greater than the threshold value, by the assumed maximum weight per sheet is set as the remaining number of stackable sheets.

In this way, since the remaining number of stackable sheets is determined based on the assumed maximum weight per sheet of the medium P, the weight of the media P on the stacking tray 40 does not exceed the upper limit.

Figure 6:
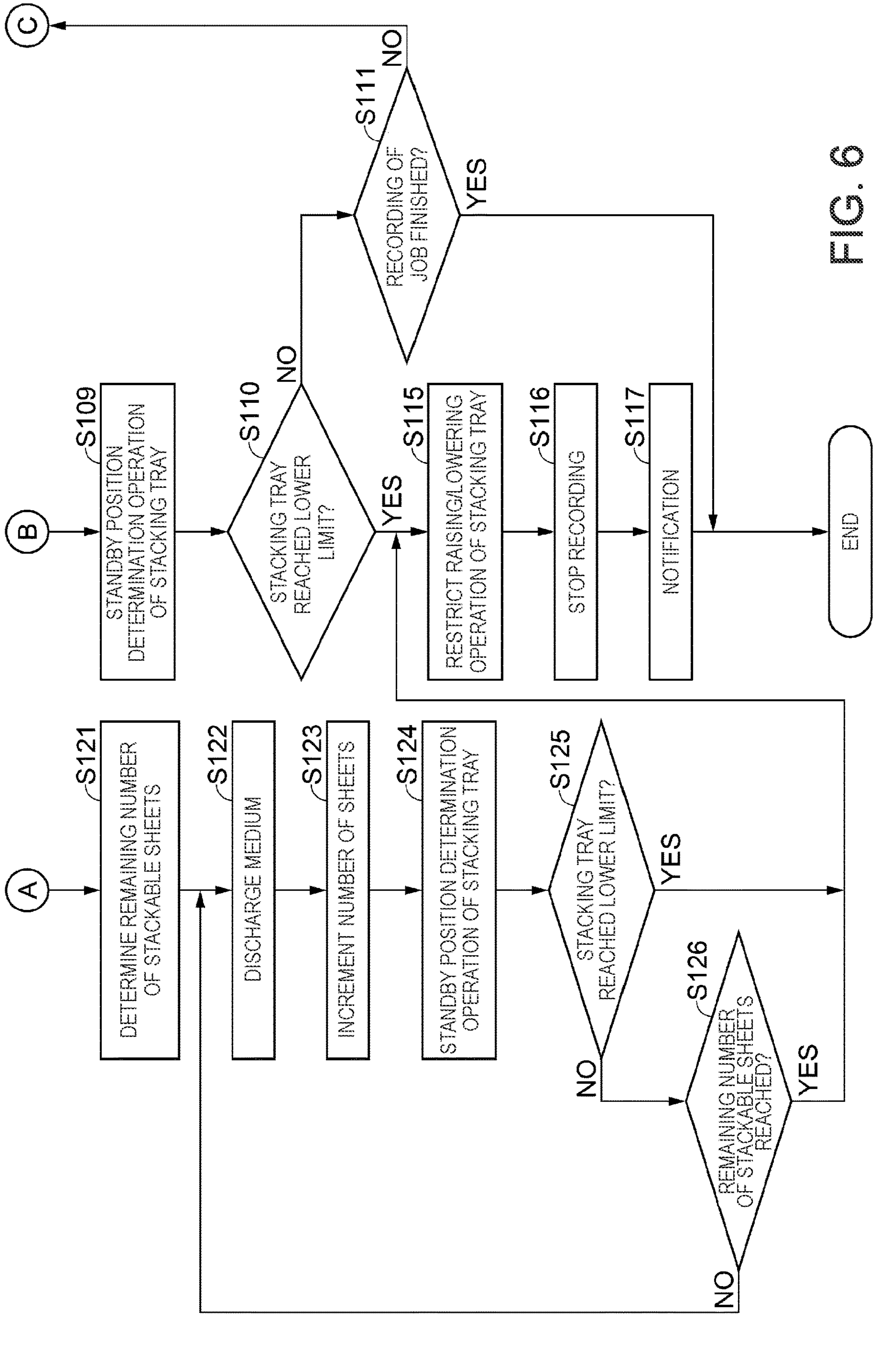
FIG. 6 is a flowchart of the raising and lowering operation of the raising and lowering mechanism according to a second embodiment.

A specific operation will be described below with reference to the flowchart of FIG. 6.

Since step S101 to S117 are the same as in the first embodiment, the description here starts with step S121. In step S113, when the count value is smaller than the predetermined value, the control unit 25 determines the remaining number of stackable sheets of medium P that can be discharged onto the stacking tray (step S121). Then, subsequent medium P is discharged (step S122), and the number of discharged sheets is incremented (step S123).

Then, the control unit 25 performs the standby position determination operation of the stacking tray 40 (step S124), and judges whether the stacking tray 40 has reached the lower limit (step S125).

In step S125, when it is judged that the stacking tray 40 has reached the lower limit position, the control unit 25 restricts the raising and lowering operation of the stacking tray 40 (step S115), prohibits recording (step S116), and notifies the user (step S117).

If it is judged in step S125 that the stacking tray 40 has not reached the lower limit position, the control unit 25 judges whether the number of sheets of medium P discharged onto the stacking tray 40 has reached the remaining number of stackable sheets (step S126). If it is judged that the number of sheets of medium P discharged onto the stacking tray 40 has reached the remaining number of stackable sheets, the process proceeds to step S115. If it is judged that the number of sheets of medium P discharged onto the stacking tray 40 has not reached the remaining number of stackable sheets, the process returns to step S122, and the same operation is repeated.

Note that in step S126 the number of sheets of medium P discharged onto the stacking tray 40 refers to the number of sheets of medium P discharged onto the stacking tray 40 after the remaining number of stackable sheets was set. That is, it is the number of sheets of medium P discharged onto the stacking tray 40 after the weight of the medium P on the stacking tray 40 became equal to or greater than the threshold value.

As a result, the operation of the stacking tray 40 is not performed in a state in which a load equal to or greater than expected is applied to the stacking tray 40, and the raising and lowering mechanism 78 can be appropriately controlled. For this reason, it is possible to reduce deterioration of the alignment property of the medium P on the stacking tray 40, and it is possible to reduce damage to the raising and lowering mechanism 78 and abnormal noise.

In addition, since an operation is not performed in a state in which an unexpected load is applied to the stacking tray 40, it is possible to reduce concerns that the stacking tray 40 will not appropriately operate and alignment of the medium P on the stacking tray 40 will deteriorate.

3. Third Embodiment

Next, a third embodiment will be described. In the following description, the same components as those of the first embodiment are denoted by the same reference numerals, and a redundant description thereof will be omitted.

In the third embodiment, the feature that the control of the stacking tray 40 is changed when the weight of the medium P on the stacking tray 40 becomes equal to or greater than the threshold value is the same as in the first embodiment and the second embodiment, but the control method is different from the first embodiment and the second embodiment.

In the present embodiment, the control unit 25 can change the rotation speed of the motor of the raising and lowering mechanism 78 when the weight of the medium P on the stacking tray 40 is equal to or greater than a threshold value.

Specifically, when the weight of the medium P on the stacking tray 40 is equal to or greater than a threshold value, the control unit 25 decreases the rotation speed of the motor. That is, the control unit 25 sets the rotation speed of the motor when the weight of the medium P on the stacking tray 40 is equal to or greater than the threshold value, to be lower than the rotation speed of the motor when the weight of the medium P on the stacking tray 40 is less than the threshold value.

Since the motor can increase the torque by decreasing the rotation speed, it is possible to appropriately control the raising and lowering mechanism 78 even in a state where a load equal to or greater than expected is applied to the stacking tray 40. For this reason, it is possible to reduce deterioration of the alignment property of the medium P on the stacking tray 40, and it is possible to reduce damage to the raising and lowering mechanism 78 and abnormal noise.

Figure 7:
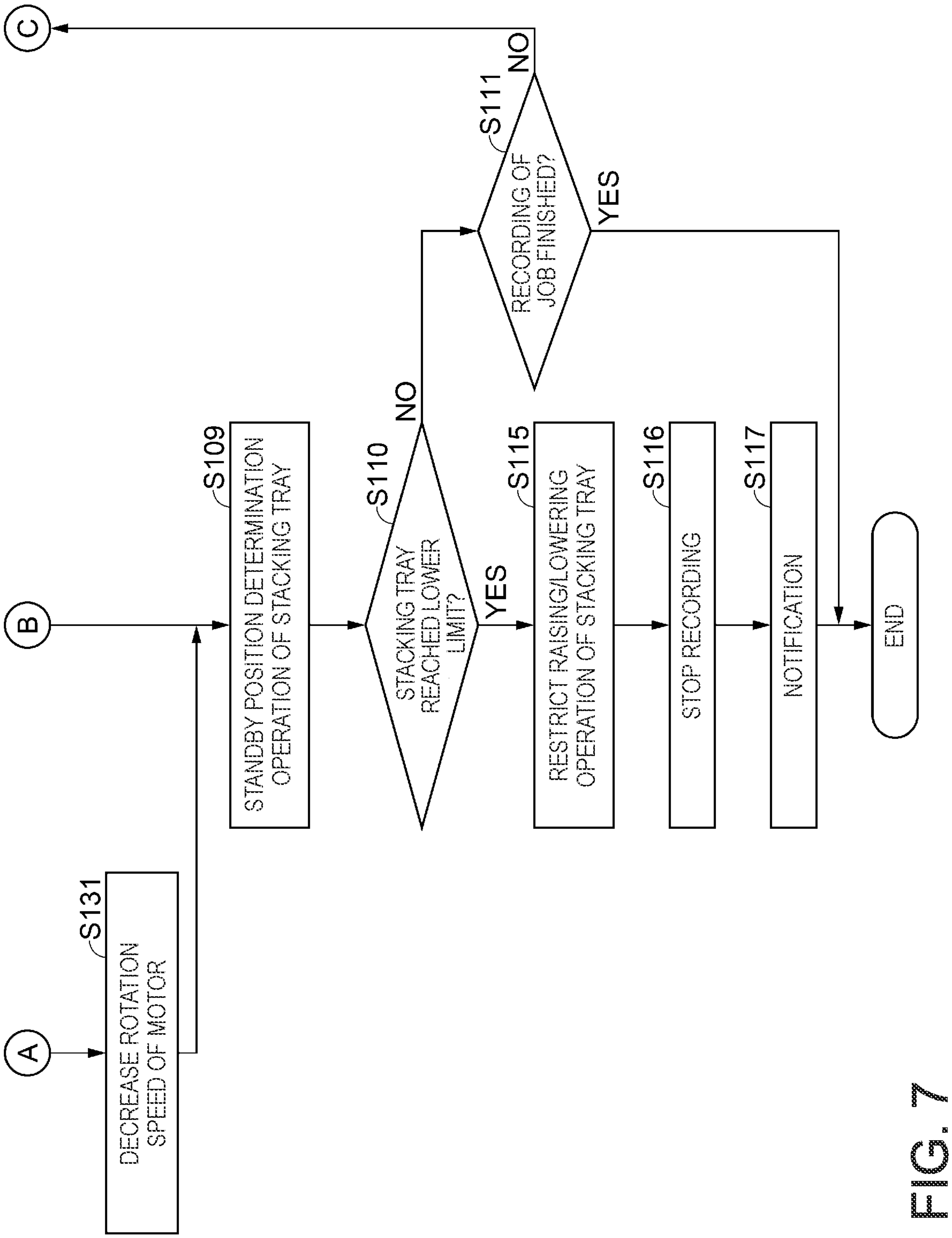
FIG. 7 is a flowchart of the raising and lowering operation of the raising and lowering mechanism according to a third embodiment.

A specific operation will be described below with reference to the flowchart of FIG. 7.

Steps S101 to S117 are the same as that of the first embodiment, and the point that step S131 is performed is different from in the first embodiment.

When the count value is smaller than the predetermined value in step S113, the control unit 25 decreases the rotation speed of the motor of the raising and lowering mechanism 78 in step S131.

As a result, it is possible to reduce deterioration of the alignment property of the medium P on the stacking tray 40, and it is possible to reduce damage to the raising and lowering mechanism 78 and abnormal noise.

In the present embodiment, it is not necessary to decrease the rotation speed of the motor in both the lowering operation and the raising operation of the stacking tray 40, and the rotation speed of the motor may only be decreased in the raising operation.

This is because when a load equal to or greater than expected is applied to the stacking tray 40, a greater load is applied to the motor in the raising operation than in the lowering operation.

Therefore, the control unit 25 may decrease the rotation speed when the stacking tray 40 performs the raising operation, and may not decrease the rotation speed when the stacking tray 40 performs the lowering operation.

Accordingly, it is possible to reduce a decrease in throughput while reducing the load applied to the motor.

In addition, in the present embodiment, the raising and lowering speed of the stacking tray 40 may be set to a plurality of levels, and the raising and lowering speed of the stacking tray 40, that is, the rotation speed of the motor may be changed according to the weight of the medium P on the stacking tray 40.

To be specific, as shown in Table 1, when the weight Z of the medium P on the stacking tray 40 is smaller than a first threshold value T1, the raising and lowering speed is set to a first speed in both the raising operation and the lowering operation. When the weight Z of the medium P on the stacking tray 40 is greater than or equal to the first threshold value T1 and less than a second threshold value T2, the raising and lowering speed is set to a second speed. When the weight Z of the medium P on the stacking tray 40 is greater than or equal to the second threshold value T2 and smaller than a third threshold value T3, the raising and lowering speed is set to a third speed.

The raising and lowering speed decreases in the order of the first speed, the second speed, and the third speed. That is, as the weight Z of the medium P on the stacking tray 40 increases, the raising and lowering speed decreases in a stepwise manner.

Accordingly, since the rotation speed of the motor can be changed according to the load applied to the stacking tray 40, it is possible to reduce the load applied to the motor while reducing a decrease in throughput.

TABLE 1

| | RAISING/LOWERING SPEED | |
|---|---|---|
| WEIGHT | RAISING OPERATION | LOWERING OPERATION |
| 0 < Z < T1 | FIRST SPEED | FIRST SPEED |
| T1 ≤ Z < T2 | SECOND SPEED | SECOND SPEED |
| T2 ≤ Z < T3 | THIRD SPEED | THIRD SPEED |

Further, as shown in Table 2, the rotation speed of the motor may be changed in accordance with the weight Z of the medium P on the stacking tray 40 only in the raising operation of the stacking tray 40.

Accordingly, it is possible to reduce a decrease in throughput while reducing the load applied to the motor.

TABLE 2

| | RAISING/LOWERING SPEED | |
|---|---|---|
| WEIGHT | RAISING OPERATION | LOWERING OPERATION |
| 0 < Z < T1 | FIRST SPEED | FIRST SPEED |
| T1 ≤ Z < T2 | SECOND SPEED | FIRST SPEED |
| T2 ≤ Z < T3 | THIRD SPEED | FIRST SPEED |

4. Fourth Embodiment

Next, a fourth embodiment will be described. In the following description, the same components as those of the first embodiment are denoted by the same reference numerals, and a redundant description thereof will be omitted.

In the fourth embodiment, the feature of changing the control of the stacking tray 40 when the weight of the medium P on the stacking tray 40 becomes equal to or greater than the threshold value is the same as that of the first to third embodiments, but the control method is different from that of the first to third embodiments.

In the present embodiment, when the weight of the medium P on the stacking tray 40 is equal to or greater than a threshold value, the control unit 25 can change the drive current of the motor of the raising and lowering mechanism 78.

Specifically, in a case where the weight of the medium P on the stacking tray 40 is equal to or greater than a threshold value, the control unit 25 performs control to increase the drive current flowing to the motor. That is, when the weight of the medium P on the stacking tray 40 is greater than or equal to the threshold value, the control unit 25 sets the drive current flowing to the motor to be greater than the drive current flowing to the motor when the weight of the medium P on the stacking tray 40 is less than the threshold value.

When the drive current flowing through the motor increases, the torque also increases. Therefore, even in a state in which a load equal to or greater than expected is applied to the stacking tray 40, the raising and lowering mechanism 78 can be appropriately controlled. For this reason, it is possible to reduce deterioration of the alignment property of the medium P on the stacking tray 40, and it is possible to reduce damage to the raising and lowering mechanism 78 and abnormal noise.

Figure 8:
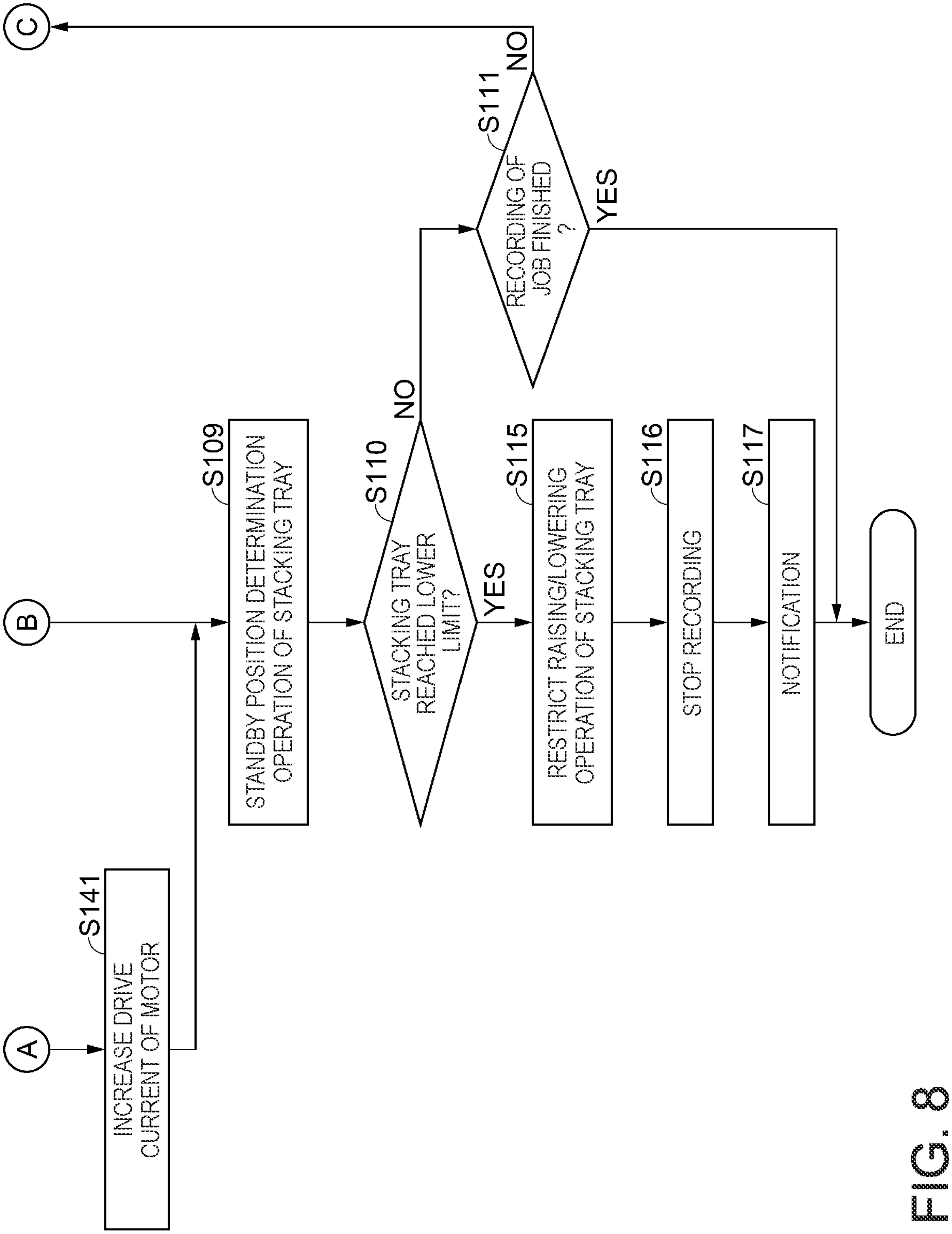
FIG. 8 is a flowchart of the raising and lowering operation of the raising and lowering mechanism according to a fourth embodiment.

A specific operation will be described below with reference to the flowchart of FIG. 8.

Steps S101 to S117 are the same as those of the first embodiment, and the point that step S141 is performed is different from in the first embodiment.

When the count value is smaller than the predetermined value in step S113, the control unit 25 increases the drive current flowing to the motor of the raising and lowering mechanism 78 in step S141.

As a result, it is possible to reduce deterioration of the alignment property of the medium P on the stacking tray 40, and it is possible to reduce damage to the raising and lowering mechanism 78 and abnormal noise.

Further, in this embodiment, the value of the current flowing through the motor may be set to a plurality of levels, and the drive current flowing through the motor may be changed in accordance with the weight of the medium P on the stacking tray 40.

To be specific, as shown in Table 3, when the weight Z of the medium P on the stacking tray 40 is smaller than a first threshold value T1, the current value of the drive current is set to a first current value in both the raising operation and the lowering operation. When the weight Z of the medium P on the stacking tray 40 is greater than or equal to the first threshold value T1 and less than a second threshold value T2, the current value is set to a second current value. When the weight Z of the medium P on the stacking tray 40 is greater than or equal to the second threshold value T2 and smaller than a third threshold value T3, the current value is set to a third current value.

The current value increases in the order of the first current value, the second current value, and the third current value. That is, the drive current can be changed in a stepwise manner as the weight Z of the medium P on the stacking tray 40 increases.

Accordingly, since the torque of the motor can be changed according to the load applied to the stacking tray 40, it is possible to reduce the load applied to the motor while reducing a decrease in throughput.

TABLE 3

| | CURRENT VALUE | |
|---|---|---|
| WEIGHT | RAISING OPERATION | LOWERING OPERATION |
| 0 < Z < T1 | FIRST CURRENT VALUE | FIRST CURRENT VALUE |
| T1 ≤ Z < T2 | SECOND CURRENT VALUE | SECOND CURRENT VALUE |
| T2 ≤ Z < T3 | THIRD CURRENT VALUE | THIRD CURRENT VALUE |

Further, as shown in Table 4, the drive current of the motor may be changed in accordance with the weight Z of the medium P on the stacking tray 40 only in the raising operation of the stacking tray 40.

Accordingly, it is possible to reduce a decrease in throughput while reducing the load applied to the motor.

TABLE 4

| | CURRENT VALUE | |
|---|---|---|
| WEIGHT | RAISING OPERATION | LOWERING OPERATION |
| 0 < Z < T1 | FIRST CURRENT VALUE | FIRST CURRENT VALUE |
| T1 ≤ Z < T2 | SECOND CURRENT VALUE | FIRST CURRENT VALUE |
| T2 ≤ Z < T3 | THIRD CURRENT VALUE | FIRST CURRENT VALUE |

Note that in the fourth embodiment, instead of increasing the drive current flowing to the motor, the current limit value may be increased.

Hereinafter, modifications of the embodiment will be described.

In the above-described first to fourth embodiments, the estimation unit 51 is configured as a functional block in the control unit 25, but may be configured by hardware different from the control unit 25.

In addition, in the first to fourth embodiments described above, the weight of the medium P is estimated and the raising and lowering mechanism 78 is controlled by the control unit 25 provided in the recording unit 2, but this disclosure is not limited to this aspect. For example, a stacking control unit having a function similar to that of the control unit 25 may be disposed inside the medium stacking device 39, and this stacking control unit may execute estimation of the weight of the medium P and control the raising and lowering mechanism 78, that is, each step of the flowcharts illustrated in FIGS. 5A, 5B, 6, 7, and 8. Alternatively, a post-processing unit having a function similar to that of the control unit 25 may be disposed outside the medium stacking device 39 inside the post-processing device 5, and the post-processing control unit may estimate the weight of the medium P and control the raising and lowering mechanism 78. In these cases, information, such as recording data, necessary for estimating the weight of the medium P may be acquired via the recording unit 2 or may be directly acquired externally. Also, in this case, the estimation unit 51 that estimates the weight of the medium P may be provided inside the stacking control unit or the post-processing control unit, or may be disposed external to the stacking control unit or the post-processing control unit.

In addition, when calculating the weight of the ink, the weight of ink is calculated from the number of dots of ink and the weight of ink per dot, but the weight of ink may be calculated based on a printing coverage ratio of recording data.

To be specific, the number of dots of ink ejected onto the medium P may be calculated from the printing coverage ratio, and the weight of ink may be calculated by multiplying the number of dots calculated from the printing coverage ratio by the weight of ink per dot.

In addition, in the first embodiment to the fourth embodiment, in a case where the weight of the medium P on the stacking tray 40 becomes equal to or greater than a threshold value, recording may be continued by changing the discharge destination of the medium P from the stacking tray 40 to another tray without interrupting recording by the line head 20.

In the first embodiment to the fourth embodiment, the timing of calculating the weight of the medium P stacked on the stacking tray 40 may be before the timing of discharging the medium P to the stacking tray 40.

In a case where the weight of the medium P stacked on the stacking tray 40 is calculated in advance and it is estimated that the calculated weight of the medium P on the stacking tray 40 is equal to or greater than the threshold value, discharge of the medium P scheduled to be discharged to the stacking tray 40 may be prohibited.

Further, at this time, recording may be continued by changing the discharge destination of the medium P from the stacking tray 40 to another tray without prohibiting discharge of the medium P.

It is needless to say that the present disclosure is not limited to the above-described embodiment, and various modifications are possible within the scope of the disclosure described in the claims, and these modifications are also included in the scope of the present disclosure.

What is claimed is:

1. A recording system comprising:
- a discharge portion that discharges medium recorded on by ejecting liquid;
- a stacking portion configured to have stacked thereon the medium discharged by the discharge portion;
- a raising and lowering unit configured to raise and lower the stacking portion;
- a control unit configured to control the raising and lowering unit;
- an estimation unit configured to estimate weight of the medium stacked on the stacking portion;
- an upper surface detection sensor configured to detect an upper surface of medium stacked on the stacking portion; and
- a lower limit sensor configured to detect that the stacking portion is at a lower limit, wherein the control unit controls a raising and lowering operation of the stacking portion based on the weight of the medium estimated by the estimation unit, when the weight of the medium estimated by the estimation unit becomes equal to or greater than a threshold value, the control unit restricts the raising and lowering operation, based on a detection result of the upper surface detection sensor, the control unit maintains the upper surface of the medium stacked on the stacking portion at a predetermined position by performing a lowering operation of lowering the stacking portion and a raising operation of raising the stacking portion after the lowering operation, the control unit lowers the stacking portion to a position detected by the lower limit sensor when the weight of the medium estimated by the estimation unit becomes equal to or greater than the threshold value, the control unit controls the raising and lowering operation of the stacking portion based on a count value of until the stacking portion is detected by the lower limit sensor, and the control unit is configured to not change the threshold value when the count value is less than a predetermined value and increase the threshold value when the count value is equal to or greater than the predetermined value.

2. The recording system according to claim 1, wherein when the weight of the medium estimated by the estimation unit becomes equal to or greater than the threshold value, the control unit determines a remaining number of stackable sheets that are stackable on the stacking portion after the weight of the medium estimated by the estimation unit becomes equal to or greater than the threshold value; and the control unit restricts the raising and lowering operation when the number of sheets of medium discharged by the discharge portion reaches the remaining number of stackable sheets after the weight of the medium estimated by the estimation unit became equal to or greater than the threshold value.

3. The recording system according to claim 2, wherein the remaining number of stackable sheets is determined based on an assumed maximum weight per sheet of medium.

4. The recording system according to claim 1, further comprising: an upper surface detection sensor configured to detect an upper surface of the medium stacked on the stacking portion, wherein based on a detection result of the upper surface detection sensor, the control unit maintains the upper surface of the medium stacked on the stacking portion at a predetermined position by performing a lowering operation of lowering the stacking portion and a raising operation of raising the stacking portion after the lowering operation and when the weight of the medium estimated by the estimation unit becomes equal to or greater than the threshold value, the control unit restricts the raising operation.

5. The recording system according to claim 1, wherein the raising and lowering unit includes a motor as a drive source; and the control unit is configured to change a rotation speed of the motor based on the weight of the medium estimated by the estimation unit and set the rotation speed of the motor to be slower when the weight of the medium estimated by the estimation unit is equal to or greater than the threshold value, than when the weight of the medium estimated by the estimation unit is less than the threshold value.

6. The recording system according to claim 5, further comprising: an upper surface detection sensor configured to detect an upper surface of medium stacked on the stacking portion, wherein based on a detection result of the upper surface detection sensor, the control unit maintains the upper surface of the medium stacked on the stacking portion at a predetermined position by performing a lowering operation of lowering the stacking portion and a raising operation of raising the stacking portion after the lowering operation and the control unit sets the rotation speed of the motor to be slower in the raising operation when the weight of the medium estimated by the estimation unit is equal to or greater than the threshold value, than the rotation speed of the motor in the raising operation when the weight of the medium estimated by the estimation unit is smaller than the threshold value.

7. The recording system according to claim 1, wherein the raising and lowering unit includes a motor as a drive source; the control unit is configured to change a drive current of the motor based on the weight of the medium estimated by the estimation unit and set the drive current of the motor to be greater when the weight of the medium estimated by the estimation unit is equal to or greater than the threshold value, than when the weight of the medium estimated by the estimation unit is less than the threshold value.

8. The recording system according to claim 7, further comprising: an upper surface detection sensor configured to detect an upper surface of the medium stacked on the stacking portion, wherein based on a detection result of the upper surface detection sensor, the control unit maintains the upper surface of the medium stacked on the stacking portion at a predetermined position by performing a lowering operation of lowering the stacking portion and a raising operation of raising the stacking portion after the lowering operation and the control unit sets the drive current of the motor to be greater in the raising operation when the weight of the medium estimated by the estimation unit is equal to or greater than the threshold value, than the drive current of the motor in the raising operation when the weight of the medium estimated by the estimation unit is smaller than the threshold value.

9. The recording system according to claim 1, wherein the predetermined value is determined based on a number of sheets of medium and an amount of liquid ejected onto the medium.

10. A recording system comprising: a discharge portion that discharges medium recorded on by ejecting liquid; a stacking portion configured to have stacked thereon the medium discharged by the discharge portion; a raising and lowering unit configured to raise and lower the stacking portion; a control unit configured to control the raising and lowering unit; an upper surface detection sensor configured to detect an upper surface of medium stacked on the stacking portion, the upper surface detection sensor including a rotatable first end portion that comes into contact with the upper surface of the medium and a second end portion that is detectable by a photo interrupter when the first end portion comes into contact with the upper surface of the medium, first and second raising and lowering guides that support a drive belt that is driven by the raising and lowering unit to raise and lower the stacking portion, a lower limit sensor configured to detect that the stacking portion is at a lower limit, the lower limit sensor including a light emitter coupled to the first raising and lowering guide and a light receiver coupled to the second raising and lowering guide, and an estimation unit configured to estimate weight of the medium stacked on the stacking portion, wherein the raising and lowering unit includes a motor as a drive source, the control unit controls a raising and lowering operation of the stacking portion based on the weight of the medium estimated by the estimation unit, and the control unit is configured to change a torque of the motor based on the weight of the medium estimated by the estimation unit, and set the torque of the motor to increase when the weight of the medium estimated by the estimation unit is equal to or greater than a threshold value, than when the weight of the medium estimated by the estimation unit is less than the threshold value.

11. The recording system according to claim 10, wherein the raising and lowering unit includes the motor as the drive source; and the control unit is configured to change a rotation speed of the motor based on the weight of the medium estimated by the estimation unit and set the rotation speed of the motor to be slower when the weight of the medium estimated by the estimation unit is equal to or greater than the threshold value, than when the weight of the medium estimated by the estimation unit is less than the threshold value.

12. The recording system according to claim 11, wherein based on a detection result of the upper surface detection sensor, the control unit maintains the upper surface of the medium stacked on the stacking portion at a predetermined position by performing a lowering operation of lowering the stacking portion and a raising operation of raising the stacking portion after the lowering operation and the control unit sets the rotation speed of the motor to be slower in the raising operation when the weight of the medium estimated by the estimation unit is equal to or greater than the threshold value, than the rotation speed of the motor in the raising operation when the weight of the medium estimated by the estimation unit is smaller than the threshold value.

13. The recording system according to claim 10, wherein the raising and lowering unit includes the motor as the drive source; the control unit is configured to change a drive current of the motor based on the weight of the medium estimated by the estimation unit and set the drive current of the motor to be greater when the weight of the medium estimated by the estimation unit is equal to or greater than the threshold value, than when the weight of the medium estimated by the estimation unit is less than the threshold value.

14. The recording system according to claim 13, wherein based on a detection result of the upper surface detection sensor, the control unit maintains the upper surface of the medium stacked on the stacking portion at a predetermined position by performing a lowering operation of lowering the stacking portion and a raising operation of raising the stacking portion after the lowering operation and the control unit sets the drive current of the motor to be greater in the raising operation when the weight of the medium estimated by the estimation unit is equal to or greater than the threshold value, than the drive current of the motor in the raising operation when the weight of the medium estimated by the estimation unit is smaller than the threshold value.

* * * * *